US005772932A

United States Patent [19]
Kamiguchi et al.

[11] Patent Number: 5,772,932
[45] Date of Patent: Jun. 30, 1998

[54] MOLD CLAMPING CONTROL METHOD FOR INJECTION MOLDING MACHINE

[75] Inventors: Masao Kamiguchi; Yuichi Hosoya, both of Kawaguchiko-machi; Koji Senda, Oshino-mura; Noriaki Neko, Fujiyoshida, all of Japan

[73] Assignee: Fanuc Ltd., Yamanashi, Japan

[21] Appl. No.: 688,245

[22] Filed: Jul. 29, 1996

[30] Foreign Application Priority Data

Jul. 29, 1995 [JP] Japan ..................................... 7-210175

[51] Int. Cl.⁶ .................................................. B29C 45/77
[52] U.S. Cl. ..................... 264/40.5; 264/328.7; 425/145; 425/150
[58] Field of Search ..................................... 264/2.2, 40.1, 264/40.5, 40.7, 328.1, 328.7, 328.11; 425/145, 149, 150

[56] References Cited

U.S. PATENT DOCUMENTS

| | | | |
|---|---|---|---|
| 5,002,706 | 3/1991 | Yamashita | 264/40.5 |
| 5,015,426 | 5/1991 | Maus et al. | 264/2.2 |
| 5,130,075 | 7/1992 | Hara et al. | 264/2.2 |
| 5,176,859 | 1/1993 | Leffew | 264/40.5 |
| 5,547,619 | 8/1996 | Obayashi | 264/40.5 |

FOREIGN PATENT DOCUMENTS 7-052209  2/1995  Japan .

*Primary Examiner*—Jill L. Heitbrink
*Attorney, Agent, or Firm*—Staas & Halsey

[57] ABSTRACT

A mold clamping control method capable of preventing any warp or strain on a molded product without stopping an injection pressure holding process so as to cancel the pressing force of an injection screw. In a series of injection and pressure holding processes, a movable platen is retracted from a mold clamping dwell position P2 to a mold opening dwell position P1, so that a substantial volume of a cavity of a mold is increased to temporarily lower the internal pressure of the cavity, thus making an internal stress of resin to be a product uniform to eliminate stress strains. In this method, an injection molding is performed to produce a precise product having no warp or strain even in molding a light guide plate which is subjected to molding abnormalities by the temporary stoppage of the injection pressure holding process according to the conventional method.

12 Claims, 4 Drawing Sheets

MOLD CLAMPING CONTROL METHOD FOR INJECTION MOLDING MACHINE

BACKGROUND OF THE INVENTION

1. Field of the Invention

The present invention relates to an improvement of a mold clamping control method for an injection molding machine.

2. Description of the Related Art

It has been known a mold clamping control method in which a mold is clamped by a clamping force lower than a rated clamping force for completing the clamping, after the mold cavity is filled with resin by an injection filling process, the filling of resin is temporarily stopped, and then further clamping the mold firmly with the rated clamping force to perform a pressure holding process with an increased injection filing pressure, as disclosed in Japanese Patent Laid-Open Publication No. Hei 7-52209.

The purpose of performing the injection filling process with the low clamping force is to expedite the escape of gas from the mold cavity. The purpose of temporarily stopping the filling process when the filling of resin is completed is to make the internal stress of resin uniform in the mold cavity by cancelling an external pressure applied to the mold cavity to thereby prevent fluctuations of the internal stress which may be a cause of warp or strain of a molded product.

However, in molding some kinds of products, e.g., a light guide plate, it is undesirable to temporarily stop the filling of resin between the injection and filling process and the pressure holding and filling process in view of molding conditions, and the method of making the internal stress uniform by stopping the injection filling process can not be always adopted.

Further, as solidification of resin in the mold cavity actually begins upon start of filling resin, it is not assured that the holding pressure is uniformly applied over the whole part of resin in the mold cavity by temporarily stopping the injection filling process and then increasing the injection pressure to perform the pressure holding and filling process. On the contrary, there is a possibility that the warp or strain is presented on the molded product due to the nonuniform internal stress caused by the holding pressure.

In other words, as the resin filled in the injection filling process has already begun to become solid at the time of start of pressure holding process, the filling pressure increased in the pressure holding process would not be necessarily applied uniformly on the resin having solid part but would be applied only on the resin near the gate where solidification is relatively low in progress, or only on the molten resin forced into the mold cavity under the increased injection filling pressure, to cause nonuniform internal stress in the resin at the individual portions of the mold cavity.

SUMMARY OF THE INVENTION

An object of the invention is to solve the problems in the prior art and to provide a mold clamping control method for an injection molding machine, which is suitable for molding a product having a large project area, such as a light guide plate, and capable of preventing a warp or strain on a molded product.

According to the present invention, a mold clamping control method for an injection molding machine comprises the steps of: advancing the movable platen to a mold clamping dwell position set between a mold touching position and a mold clamping completion position to hold the movable platen in the mold clamping dwell position, and starting injection; retracting the movable platen to a mold opening dwell position set between the mold touching position and the mold clamping dwell position to hold the movable platen in the mold opening dwell position; and advancing the movable platen to the mold clamping completion position.

In the present invention, the injection-filling process and the pressure holding-filling process are continuously performed and in these processes the movable platen is retracted to substantially increase a volume of the mold cavity so that the inside pressure of the cavity is relatively lowered, thus making the internal stress uniform and eliminating the stress strains. As a result, the restriction of molding conditions of temporarily stopping the filling of resin between the injection-filing process and the pressure holding-filling process is removed and therefore an injection molding of a light guide plate, etc. can be well performed.

Further, as the injection is started in a stage where the movable platen is advanced to the mold clamping dwell position preset between the mold touching position and the mold clamping completion position, namely, under the condition where the clamping force is lower than the rated clamping force, gas in the cavity easily escapes, to allow the resin to come up to every corner of the mold cavity. It is therefore possible to perform the injection filling process with a low injection pressure without causing any molding inferiority such as short shot, thus preventing any faulty molding such as burrs.

Subsequently, the movable platen is retracted to the mold opening dwell position, which is set between the mold touching position and the mold clamping dwell position, namely, to a position backward of the injection start position to increase the volume of the mold cavity while keeping the pressure applied to resin by the injection screw, thereby relatively lowering the internal pressure of the cavity to make the internal stress of resin uniform and eliminate any stress strain of the resin.

A final holding pressure is applied to the resin with the movable platen advanced to the mold clamping completion position. At that time, the internal pressure of resin increases as the mold cavity volume is compressed by the advancement of the movable platen, and therefore an additional quantity of molten resin would not flow into the mold cavity from the injection cylinder even when the holding pressure is high. Specifically, all of the resin existing inside the mold cavity at the time of final clamping is the resin which has been already filled in the mold cavity from the beginning of the injection process, this is, all of the resin in the mold cavity has no difference in heat history and has substantially the same state of solidification. Since the resin has the same state of solidification over the individual portions of the mold cavity, the pressure applied by the final clamping and the pressure holding process by the screw is made substantially uniform at every portion of the mold cavity, thus securing uniformity of the pressure application. Accordingly, an inadvertent warp or strain never occurs on a molded product even if high holding pressure is applied.

Further, since the substantial holding pressure is not provided by the pressing force of the screw through the gate, but is provided by the compression of volume of the cavity by means of the final clamping, the resin pressure is substantially uniform over any part of the cavity projected on a plane perpendicular to the mold opening and closing direction, so that any warp or strain caused by the final compressing action is prevented.

The timing to start retracting the movable platen from the mold clamping dwell position may be determined based on confirmation that a predetermined time has been lapsed using a timer, that the injection screw has been arrived at a predetermined position and that the injection pressure has reached a predetermined value.

The retracting operation of the movable platen from the mold clamping dwell position to the mold opening dwell position can be performed by positively driving the driving means for the movable platen, or by limiting an output of the driving means for the movable platen to a set value to retract the movable platen utilizing the clamping reaction force and resin reaction force.

In retracting the movable platen utilizing the clamping reaction force and the resin reaction force, the movable platen may not be adequately retracted if these reaction forces are small. To deal with such case, a lapsed time measuring timer is additionally used for measuring a predetermined time and if the movable platen is not retracted to the mold opening dwell position when the timer measures the predetermined time, the limitation to the output of the driving means is removed to allow the movable platen to advance to the mold clamping completion position to perform the final clamping. Further, as the time lapsed in retracting the movable platen and a holding time at the mold opening dwell position are not fixed, the final clamping is started when the predetermined time is measured by the timer, even if the movable platen arrives at the mold opening dwell position.

DETAILED DESCRIPTION OF THE PREFERRED EMBODIMENTS

Figure 1:
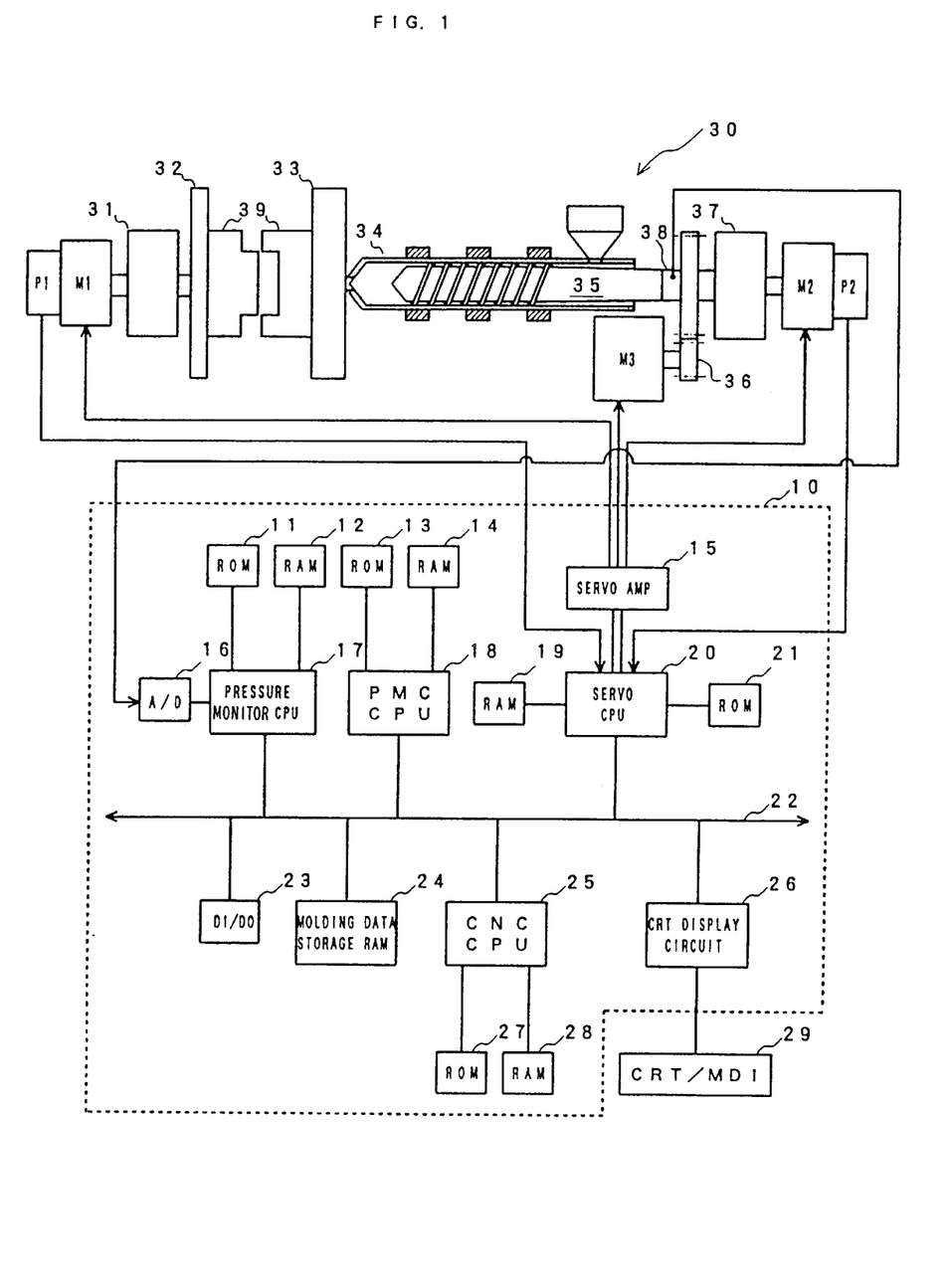
FIG. 1 is a block diagram of a principal part of an injection molding machine for carrying out the method of the present invention.

In FIG. 1, a mold 39 is mounted between a fixed platen 33 and a movable platen 32. The movable platen 32 is movable along a tie bar of an injection molding machine 30 by a driving power of an output shaft of a servo motor M1 for clamping through a clamping mechanism 31 including a ball-nut-and-screw mechanism or a toggle mechanism, in a conventional manner. An injection screw 35 disposed in an injection cylinder 34 is driven in the axial direction by a servo motor M2 for injection through a driving force converting mechanism 37 for converting rotation of an output shaft of a drive source into linear motion in the direction of an injection axis. The injection screw 35 is rotated for measurement by a motor M3 for rotating the screw through a gear mechanism 36.

A pressure detector 38, such as a load cell, is provided on the proximal portion of the injection screw 35, and detecting a resin pressure acting axially of the injection screw 35, i.e., an injection dwell pressure in the injection pressure dwelling process and a screw back pressure in the measuring and kneading process.

On the servo motor M2 for injection a pulse coder P2 is arranged for detecting a position and a moving speed of the injection screw 35, and on the servo motor M1 for clamping, a pulse coder P1 is arranged for detecting a position of a cross head of the clamping mechanism 31 for forcing the movable platen 32. All o f these elements are known in the art.

A controller 10 for drivingly controlling the injection molding machine 30 comprises a CNC CPU 25 as a microprocessor for numerical control, a PMC CPU 18 as a microprocessor for programmable machine control, a servo CPU 20 as a microprocessor for servo control, and a pressure monitor CPU 17 for sampling processing of the injection holding pressure and the screw back pressure through an A/D converter 16 and the pressure detector 38. Information can be transmitted between the individual microprocessors through a bus 22 by selecting their mutual input/output.

The PMC CPU 18 is connected with a ROM 13 which stores a sequence program for controlling the sequence operations of the injection molding machine 30 and a RAM 14 for temporary storage of arithmetic data. The CNC CPU 25 is connected with a ROM 27 which stores a program for generally controlling the injection molding machine 30 and a RAM 28 for temporary storage of arithmetic data.

Further, the servo CPU 20 is connected with a ROM 21 which stores a control program dedicated for the servo control and a RAM 19 for temporary storage of data and the pressure monitor CPU 17 is connected with a ROM 11 which stores a control program relating to the sampling processing of the injection holding pressure and a RAM 12 for temporary storage of data. The servo CPU 20 is also connected with a servo amplifier 15 for driving respective servomotors for ejection (not shown), for clamping, for injection and for screw rotation based on the commands from the CPU 20. The respective outputs from the pulse coder P1 associated with the servo motor M1 for clamping and the pulse coder P2 associated with the servo motor M2 for injection are fed back to the servo CPU 20. A current position of the cross head of the clamping mechanism 31 calculated by the servo CPU 20 based on the feedback pulse from the pulse coder P1, and a moving speed and a current position of the screw 35 calculated by the servo CPU 20 based on the feedback pulse from the pulse coder P2 are stored and updated in a current-position-storage register and a current-speed-storage register of the RAM 19, respectively.

An interface 23 serves as an input/output interface for receiving signals from limit switches arranged at individual parts of the injection molding machine 30 and from an operation panel and for transmitting various commands to peripheral equipments of the injection molding machine 30. A manual data input device 29 with a display is connected to the bus 22 via a CRT display circuit 26, and capable of selecting operation of display pictures for a data set-up and a monitor display, etc., and of inputting various data. For these operations, the data input device 29 is equipped with numeral key for inputting numeral data, various function keys and cursor shift keys.

A nonvolatile memory 24 serves as a molding-data-storage memory for storing various set values, parameters and macro variables concerning the injection molding operations. Further, in this embodiment, the nonvolatile memory 24 stores a set time of a timer, a position of the injection screw and an injection pressure (usually any one of these conditions) for defining a timing to start retracting the movable platen 32 from the mold clamp stopping position, and a holding time to hold the movable platen 32 at the mold opening stopping position.

With the foregoing arrangement, the CNC CPU 25 distributes pulses to the respective servo motors based on the control program stored in the ROM 27 and the molding conditions stored in the nonvolatile memory 24. The servo CPU 25 performs the servo control including a position loop control, a speed loop control and a current loop control based on move commands distributed for respective axes, and the position and speed feedback signals detected by the detectors such as pulse coders P1 and P2, to execute a so-called digital servo processing.

Figure 5:
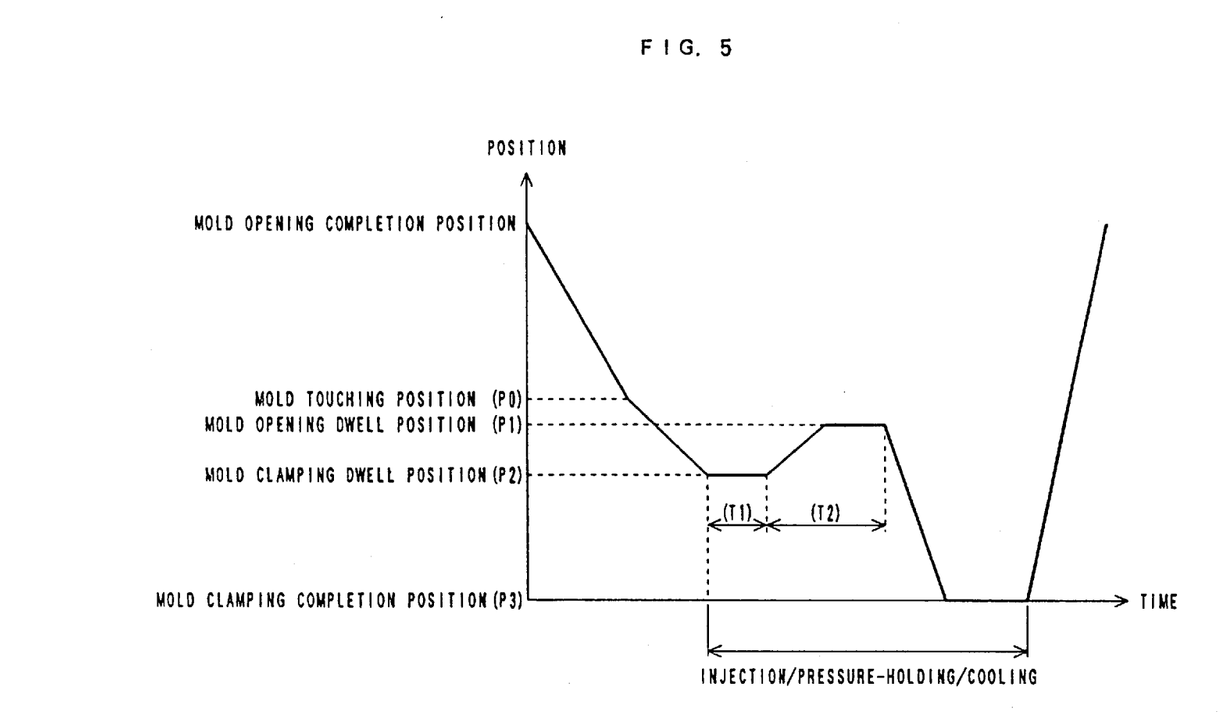
FIG. 5 is a schematic diagram showing the relationship between lapsed time from the starting of mold closing and a position of the movable platen.

FIG. 5 is a schematic diagram showing the mold clamping control method according to one embodiment by the relationship between the time lapsed after starting mold closing and the position of the movable platen 32. When the clamping mechanism 31 comprises a toggle mechanism, the position detected by the pulse coder P1 is actually the position of the cross head rather than the position of the movable platen 32 itself. However, since a formula for conversion between the position of the cross head and the position of the movable platen 32 and an internal processing necessary for the conversion are well known, the position of the movable platen 32 is regarded to be directly detected and hence the description will be made with reference to the position of the movable platen 32 in FIG. 5 and in flowcharts described below.

As shown in FIG. 5, the mold clamping dwell position P2 has to be set between a mold touching position P0 and a mold clamping completion position P3, while the mold opening dwelling position P1 has to be set between the mold touching position P0 and the mold clamping dwell position P2. The timing to start retracting the movable platen 32 from the mold clamping dwell position P2 may be set based on any of conditions, such as the set time by the timer, the position of the injection screw 35 during injection or the set value of the injection pressure. Which condition should be used to decide the timing to start retracting the movable platen 32 is selected in due consideration of the mold 39 and a product to be molded and a characteristic of resin to be used.

Figure 2:
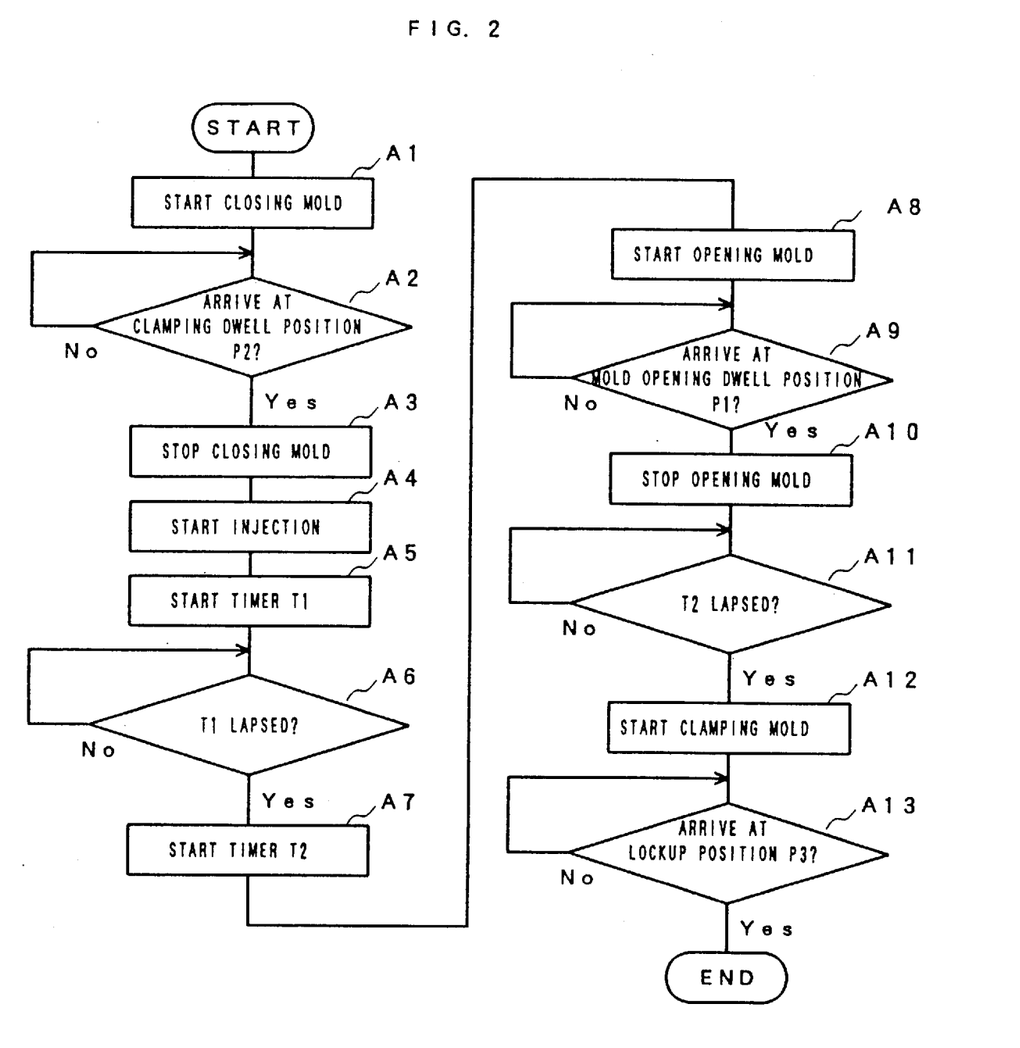
FIG. 2 is a flowchart schematically showing the mold clamping control method of the present invention.

First, referring to the flowchart of FIG. 2, an example in which the timing to start retracting the movable platen 32 from the clamp dwelling position P2 is set by the timer will be described. The flowchart of FIG. 2 shows processing performed by the PMC CPU 18 from the starting of the mold closing to the completion of mold clamping, and the description relating all of other known processes, such as measuring by rotation of the screw and removing a molded product by an ejector is omitted.

The PMC CPU 18 outputs a mold closing command to the CNC CPU 25 to start driving of the servo motor M1 for clamping to thereby start the mold closing operation of the movable platen 32 from the mold opening completion position (Step A1). Then, the PMC CPU 18 waits until the movable platen 32 arrives at the mold clamping dwell position P2 (Step A2), temporarily stops moving the movable platen 32 at the mold clamping dwell position P2 and holds the movable platen 32 in the position P2 (Step A3). Then the PMC CPU 18 drives the servo motor M2 for injection to start the injection (Step A4) and also to start the lapsed time measuring timer having a set holding time T1 to hold the movable platen 32 in the mold clamp termination position P2 (Step A5). As shown in FIG. 5, the moving speed of the movable platen 32 is set to change to a low speed at the mold touching position P0 for the purpose of protecting the mold.

As already mentioned, since the mold clamping dwell position P2 is set before the mold clamping completion position P3, the clamping force at the injection starting time is far low compared with the rated clamping force so that air in the mold 39 can easily escape from a parting line of the mold to spurt outside. Accordingly, occurrence of burn and bubbles in a molded product due to gas compression are avoided. Further, as the molten resin easily flows in the cavity, the resin can fill the mold by a low injection pressure so that occurrence of burrs is also avoided without difficulty.

Upon termination of measuring of the holding time T1 by the lapsed time measuring timer with filling of resin in the cavity of the mold 39 advanced (Step AG), the PMC CPU 18 sets in the lapsed time measuring timer a holding time T2 for which the movable platen 32 is held in the mold opening dwelling position P1 to start the lapsed time measuring timer (Step A7), simultaneously, reversely drives the clamping servo motor M1 to start the mold opening action of the movable platen 32 (Step A8), and waits until the movable platen 32 arrives at the mold opening dwelling position P1 (Step A9). Upon arrival at the mold opening dwelling position P1, the movable platen 32 is held in the position P1 (Step A10). Accordingly, strictly speaking, the holding time T2 is not a holding time to hold the movable platen 32 in the mold opening dwelling position P1, but it is a time including the moving time from the mold clamping dwell position P2 and the mold opening dwelling position P1. Alternatively, the timer T2 may be started after Step A9 rather than after Step AG, so that the holding time at the mold opening dwelling position P1 is a set holding time T2.

Thus, as the movable platen 32 is retracted during the filling of resin in the cavity of the mold 39, the volume of the cavity of the mold 39 substantially increases to relatively lower the internal pressure of the cavity, so that the internal stress of the filled resin is made uniform and the stress strain is eliminated.

When the measurement of the lapsed time measuring timer is terminated at the mold opening dwelling position P1 with the lapse of a predetermined time T2, and the internal stress of a molded product is made uniform (Step A11), the PMC CPU 18 controls the clamping servo motor M1 to rotate normally so as to restart the clamping action of the movable platen 32 (Step A12), and waits until the movable platen 32 arrives at the mold clamping completion position P3 (Step A13), Thereafter, the PMC CPU 18 controls the following processes, such as cooling, measurement by screw rotation and removal of a molded product by an ejector, in the conventional manner, to finalize one molding cycle.

Since the sealing state of the gate has further progressed at the time when the holding time T2 is lapsed for holding the movable platen 32 in the mold opening dwelling position P1, compared with that at the time when the holding time T1 is lapsed, the resin inside the mold cavity is strongly compressed due to the reduced cavity volume which is caused by the movement of the movable platen 32 from the mold opening dwelling position P1 to the mold clamping completion position P3, so that the profiles and complex engravings are exactly transferred to the resin to be a molded product. Further, as the mold 39 is clamped by a strong clamping force and the gate seal is substantially completed, no additional molten resin flows into the cavity of the mold 39 from the injection cylinder 34 even when the injection holding pressure is high, so that nonuniform internal stress caused by the additional resin as well as occurrence of strains can be prevented.

Further, since the substantial holding pressure is not provided by the pressing force of the screw 35 through the gate, but is provided by the compression of volume of the cavity by means of the final clamping, the resin pressure is substantially uniform over any part of the cavity projected on a plane perpendicular to the mold opening and closing direction, so that any warp or strain caused by the final compressing action is prevented.

Consequently, the final pressure holding process is performed not only by the pressing force of the screw 85 but also by the advancing action of the movable platen 32 with a strong clamping force, namely, by the increase of the internal pressure due to the reduction of volume of the cavity under a fixed quantity of the filled resin. The method of the present invention is particularly effective for a mold that is difficult to apply the holding pressure by the screw 35 because the gate seal is completed earlier, and hence tends to make depressions in a molded product.

Figure 3A:
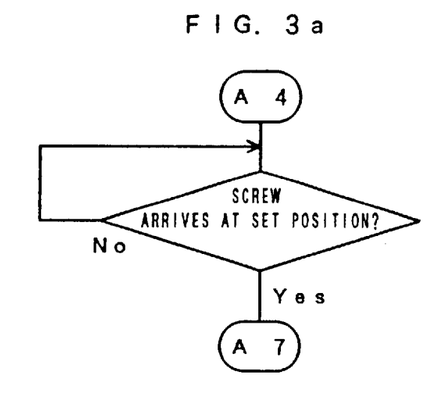
FIG. 3a shows discrimination processing in the case where a movable platen is started to retract when it is detected that an injection screw arrives at a predetermined position.
Figure 3B:
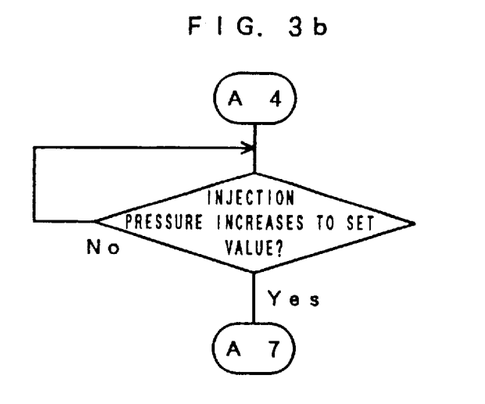
FIG. 3b shows discrimination processing in the case where the movable platen is started to retract when it is detected that an injection pressure reaches a predetermined value.

In the foregoing description, the timing to start retracting the movable platen 32 from the mold clamping dwell position P2 is determined by the set time using the timer, according to one embodiment of the present invention. Alternatively, the retracting of the movable platen 32 may be started on the basis of the position of the injection screw 35 or the injection pressure in the injection process. In the case where the retracting of the movable platen 32 is started when it is detected that the injection screw 35 arrives at a predetermined position, the discrimination processing as shown in FIG. 3a is substituted for the above-mentioned Steps A5 and A6. In the case where the retracting of the movable platen 32 is started when it is detected that the injection pressure reaches a predetermined value, the discrimination processing as shown in FIG. 3b is substituted for the above-mentioned Steps A5 and A6.

The timing for restarting the clamping action from the mold opening dwelling position P1 is determined likewise the starting of the retracting action from the mold clamping dwell position P2, thus the discrimination processing of Step A11 can be performed based on the position of the injection screw 35 or the injection pressure. In this case, the processing of Step A7 can be omitted, however, it is preferable to start the measurement of lapsed time from when the movable platen 32 is retracted to the mold opening dwelling position P1, to proceed to the clamping action if the position of the injection screw 35 or the injection pressure do not reach the set values after the lapse of a predetermined time. This is because the position of the injection screw 35 and the injection pressure do not necessarily reach the set values after the movable platen 32 is retracted to the mold opening dwelling position P1.

Figure 4:
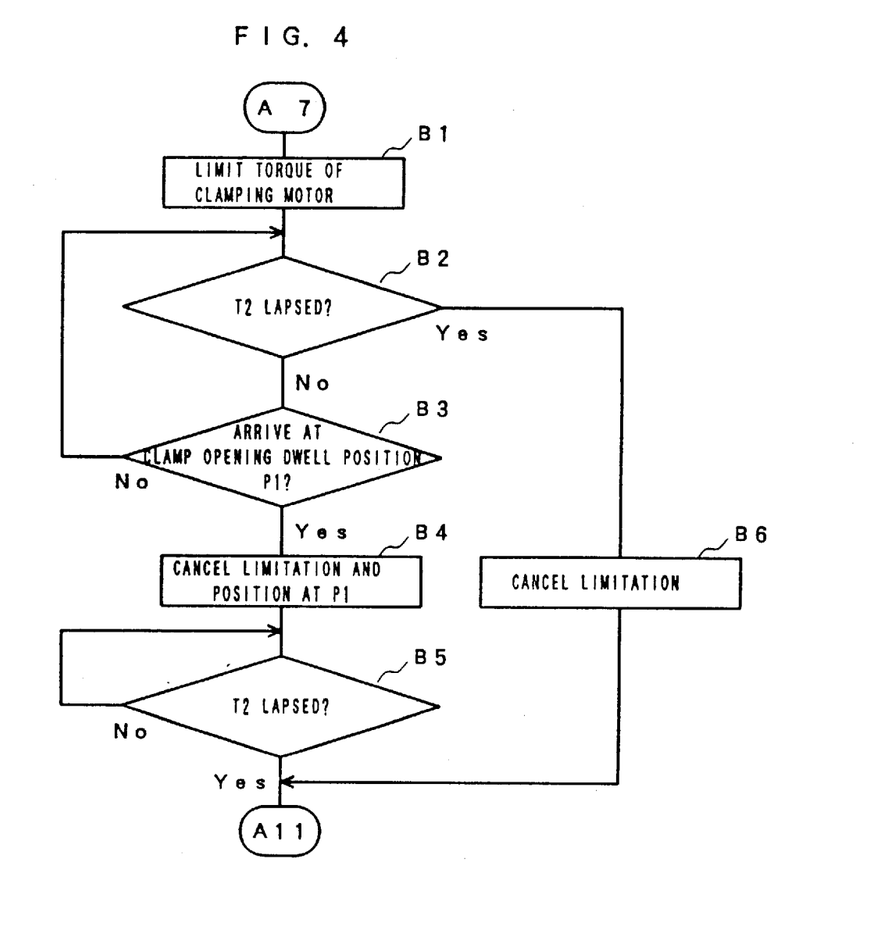
FIG. 4 is a flow diagram showing a process when the movable platen is retracted using the clamping reaction force and the resin reaction force.

Further, for retracing the movable platen 32 utilizing the clamping reaction force and the resin reaction force instead of positively reversing the clamping servo motor M1, processing of Steps B1 through B6 as shown in FIG. 4 is substituted for the above-mentioned processing of Steps A8 through A11.

In summary, by limiting the output torque of the clamping servo motor M1 which holds the movable platen 32 in the mold clamping dwell position P2, instead of retracting the movable platen 32 by positively reversing the clamping servo motor M1 (Step B1), the movable platen 32 is retracted using the clamping reaction force and the resin reaction force. In this case, the movable platen 32 may not be pushed back to the mold opening dwell position P1 by the clamping reaction force and the resin reaction force in dependence on molding conditions. Therefore, in this embodiment, after the driving torque of the clamping servo motor M1 is restricted in Step B1, the PMC CPU 18 repeatedly executes discrimination processing for discriminating whether or not the operation of the lapsed time measuring timer which has started measuring in Step A7 has been terminated (Step B2), and discrimination processing for discriminating whether or not the movable platen 32 has been pushed back to the mold opening dwell position P1 (Step B3).

If the movable platen 32 has been pushed back to the mold opening dwell position P1 before the operation of the lapsed time measuring timer is terminated, the PMC CPU 18 cancels the limitation of the driving torque of the clamping servo motor M1 to hold the movable platen 32 in the current position, i.e., the mold opening dwell position P1 (Step B4), then waits until the operation of the lapsed time measuring timer is terminated, i.e., until the holding time T2 lapses at the mold opening dwell position P1 (Step B5), and thereafter starts the final clamping action in Step A12 in the manner as mentioned above. If the movable platen 32 is necessarily pushed back to the mold opening dwell position depending on the molding conditions, the holding time T2 may be measured by starting the lapsed time measuring timer when the movable platen 32 arrives at the mold opening dwell position P1.

If the operation of the lapsed time measuring timer has been terminated before the movable platen 32 is pushed back to the mold opening dwell position P1, it means that it is difficult to retract the movable platen 32 by the clamping reaction force and the resin reaction force. Consequently, the PMC CPU 18 cancels the limitation to the driving torque of the clamping servo motor M1 (Step B6) and starts the final clamping action at Step A12 in the same manner as mentioned above. In this case, the movable platen is not retracted to the mold opening dwell position P1, but it is sufficient that the movable platen 32 is slightly retracted from the mold clamping dwell position P2 in order to prevent the warp or strain by making the internal stress uniform.

According to the present invention, as the internal stress of resin is made uniform without stress strain by substantially increasing a volume of the mold cavity in the injection pressure holding process to temporarily lower the internal pressure of the mold cavity, it is not necessary to interrupt the injection pressure holding process and cancel the pushing force by the screw in order to make the internal stress uniform, and thus the injection process and the pressure holding process can be performed continuously. Accordingly, the injection molding is performed to produce a precise molded product without age variation of warp or strain, even in molding a product, such as a light guide plate, which has a large project area and hence tends to cause molding abnormalities by the interruption of the injection process.

Further, since the substantial holding pressure is not provided by the pressing force of the screw through the gate, but is provided by the compression of volume of the cavity by means of the final clamping, the resin pressure is substantially uniform over any part of the cavity projected on a plane perpendicular to the mold opening and closing direction, so that any warp or strain caused by the final compressing action is prevented. Still further, as the ability of transfer of the minute cavity shape is excellent, a molded product having a large projected area can be well molded irrespective of thickness, and in particular for a product of large thickness, depressions are also prevented.

What is claimed is:

1. A mold clamping control method for an injection molding machine in which a mold is clamped by moving a movable platen with respect to a stationary platen, said method comprising:

(a) advancing said movable platen to a mold clamping dwell position set between a mold touching position and a mold clamping completion position to hold said movable platen in said mold clamping dwell position, and starting injection;

(b) retracting said movable platen to a mold opening dwell position set between said mold touching position and said mold clamping dwell position to hold said movable platen in said mold opening dwell position; and (c) advancing said movable platen to said mold clamping completion position.

2. A mold clamping control method according to claim 1, wherein said step (a) includes the step of holding said movable platen in said mold clamping dwell position for a predetermined time.

3. A mold clamping control method according to claim 1, wherein said step (a) includes the step of holding said movable platen in said mold clamping dwell position until an injection screw of the injection molding machine arrives at a predetermined position.

4. A mold clamping control method according to claim 1, wherein said step (a) includes the step of holding said movable platen in said mold clamping dwell position until an injection pressure reaches a predetermined value.

5. A mold clamping control method according to claim 1, wherein said step (b) includes:

retracting said movable platen from said mold clamping dwell position to said mold opening dwell position by driving said movable platen by clamping means for moving said movable platen with respect to said stationary platen, to hold said movable platen in said mold opening dwell position; and advancing said movable platen when a predetermined time is lapsed from the start of said retracting.

6. A mold clamping control method according to claim 1, wherein said step (b) includes:

retracting said movable platen from said mold clamping dwell position to said mold opening dwell position by driving said movable platen by clamping means for moving said movable platen with respect to said stationary platen, to hold said movable platen in said mold opening dwell position; and advancing said movable platen when a predetermined time is lapsed from the time when said movable platen arrives at said mold opening dwell position.

7. A mold clamping control method according to claim 1, wherein said step (b) includes:

limiting an output of said clamping means to a set value after said movable platen is held in said mold clamping dwell position;

canceling the limitation of the output of the clamping means when the movable platen is retracted to arrive at said mold opening dwell position; and advancing said movable platen when a predetermined time is lapsed from the start of said retracting.

8. A mold clamping control method according to claim 1, wherein said step (b) includes:

limiting an output of the clamping means to a set value after the movable platen is held in said mold clamping dwell position;

canceling the limitation of the output of the clamping means when said movable platen is retracted to arrive at said mold opening dwell position to hold said movable platen in said mold opening dwell position; and advancing said movable platen when a predetermined time is lapsed from the time when said movable platen arrives at said mold opening dwell position.

9. A mold clamping control method for an injection molding machine in which a mold is clamped by clamping means for moving a movable platen with respect to a stationary platen, said method comprising:

(a) advancing said movable platen to a mold clamping dwell position, which is set between a mold touching position and a mold clamping completion position, by said clamping means to hold said movable platen in said mold clamping dwell position, and starting injection;

(b) limiting an output of said clamping means to a set value and starting a lapsed time measuring timer; and (c) cancelling the limitation of the output of said clamping means and advancing said movable platen to said mold clamping completion position, if said movable platen is not retracted to a mold opening dwell position when said lapsed time measuring timer measures a predetermined time, and canceling the limitation of the output of said clamping means and holding said movable in said mold opening dwell position until said lapsed time measuring timer measures said predetermined time, and advancing the movable platen to said mold clamping completion position when said lapsed time measuring timer measures said predetermined time, if said movable platen arrives at said mold opening dwell-position before said lapsed time measuring timer measures said predetermined time.

10. A mold clamping control method according to claim 9, wherein said step (a) includes the step of holding said movable platen in said mold clamping dwell position for a predetermined time.

11. A mold clamping control method according to claim 9, wherein said step (a) includes the step of holding said movable platen in said mold clamping dwell position until an injection screw of the injection molding machine arrives at a predetermined position.

12. A mold clamping control method according to claim 9, wherein said step (a) includes the step of holding said movable platen in said mold clamping dwell position until an injection pressure reaches a predetermined set value.

* * * * *

UNITED STATES PATENT AND TRADEMARK OFFICE
CERTIFICATE OF CORRECTION

PATENT NO. : 5,772,932
DATED : June 30, 1998
INVENTOR(S) : Kamiguchi et al.

It is certified that error appears in the above-identified patent and that said Letters Patent is hereby corrected as shown below:

Title Page, [75], line 2, change "Kawaguchiko-machi" to --Minamitsuru--.

line 3, change "Oshino-mura" to --Minamitsuru--.

Col. 6, line 22, change "(Step AG)" to --(Step A6)--;
line 36, change "Alternatively" to --Alternatively--;
line 38, change "Step AG" to --Step A6--.

Col. 10, line 20, change "clam ping" to --clamping--.

Signed and Sealed this

Tenth Day of November 1998

Attest:

BRUCE LEHMAN

*Attesting Officer*      Commissioner of Patents and Trademarks